(12) United States Patent
Seacombe

(10) Patent No.: US 6,501,576 B1
(45) Date of Patent: Dec. 31, 2002

(54) WIRELESS DATA TRANSFER USING A REMOTE MEDIA INTERFACE

(75) Inventor: Ian Seacombe, Reseda, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,764

(22) Filed: Mar. 24, 1999

(51) Int. Cl.[7] .............................................. H04B 10/00
(52) U.S. Cl. ....................... 359/152; 359/172; 379/56.3
(58) Field of Search ................................ 359/152, 172; 379/56.3, 102.02, 102.03; 370/277, 310

(56) References Cited

U.S. PATENT DOCUMENTS

| | | | |
|---|---|---|---|
| 5,103,108 A | 4/1992 | Crimmins | 250/338.1 |
| 5,142,396 A | 8/1992 | Divjak et al. | 359/142 |
| 5,416,627 A | 5/1995 | Wilmoth | 359/159 |
| 5,508,836 A | 4/1996 | DeCaro et al. | 359/189 |
| 5,557,634 A | 9/1996 | Balasubramanian et al. | 375/222 |
| 5,566,022 A | 10/1996 | Segev | 359/172 |
| 5,621,384 A | 4/1997 | Crimmins et al. | 340/539 |
| 5,636,264 A | 6/1997 | Sulavuori et al. | 379/56 |
| 5,995,593 A | * 11/1999 | Cho | 379/56.3 |
| 6,337,856 B1 | * 1/2002 | Schanhals et al. | 370/352 |

OTHER PUBLICATIONS

Carol Levin, *The Web, Now in Infrared*, PC Magazine, Feb. 23, 1999, p. 36.

* cited by examiner

*Primary Examiner*—Kinfe-Michael Negash
(74) *Attorney, Agent, or Firm*—Kenneth J. Cool

(57) ABSTRACT

A system and method for wireless data transfer between a computer and a telephone line using a remote media interface (RMI). The computer bidirectionally transfers the data to the RMI using an infrared (IR) signal. The RMI acts as an interface between the computer and the telephone line. The wireless data transfer system of the present invention includes an IR transceiver housed on the computer and an IR transceiver housed on the RMI. The RMI includes a data access arrangement (DAA) for converting the data received from the computer into a signal suitable for transmission over the telephone line and vice versa. The RMI also includes an external data interface connected to the telephone line that receives and transmits the signal over the telephone line. A soft modem is installed on the computer whereby at least part of the soft modem uses software to perform the function of a digital signal processor.

26 Claims, 1 Drawing Sheet

WIRELESS DATA TRANSFER USING A REMOTE MEDIA INTERFACE

BACKGROUND OF THE INVENTION

1. Field of the Invention

The present invention relates in general to data communications peripherals and more particularly to a system and a method for wireless data transfer between a computer and a telephone line using a remote media interface.

2. Background Art

Data communications peripherals such as modems are important and ubiquitous devices that allow a computer to transmit and receive data over telephone lines. Data may include text, sounds, images and video. The word "modem" is a concatenation of modulator and demodulator. In general, a modem operates by taking a digital data stream and converting the digital data into a modulated analog signal for transmission over the telephone line. Because most telephone lines are designed to transmit only analog information the modulator in the modem ensures that the modulated analog signal conforms to the voice-like signal requirements of the telephone line. The demodulator is a complementary device that converts the modulated analog signal into a digital data stream.

A typical modem is made up of a several components that are used for both transmission and reception. For example, the transmission of data over a telephone line begins in data terminal equipment (DTE). The DTE, which is an interface between the computer and the modem, converts user input into digital data streams for transmission and vice versa. The DTE includes control logic, buffer and one or more input and output devices to the computer and essentially controls the flow of data in or out of the computer.

The digital data stream from the DTE then flows into the digital signal processor (DSP). The DSP, also known as a data pump, contains signal processing algorithms that manipulate and convert the digital data from a digital data stream into a modulated analog signal and vice versa. A controller, which is generally a microprocessor having storage media, is used for control, buffering and processing by the DTE and DSP.

After processing by the DSP the modulated analog signal is received by a data access arrangement (DAA). The DAA is data communications equipment that is furnished or approved by a common carrier (for example, a telephone company) that permits the attachment of privately owned data terminal and communications equipment to the common carrier's network. Typically the DAA is an impedance matching device that acts as an electrical interface converter to convert the modulated analog signal into a signal compatible with local telephone lines. In addition, the DAA contains protection circuitry to safeguard the modem components from damage by the telephone line and vice versa. Because the DAA is the interface between the user's computer and the common carrier's network the DAA is usually the only part of the modem subject to government regulation. The DAA must meet the local requirements and regulations before it can be certified for use in the modem.

Electrical power required to operate the modem components generally comes from the computer's power supply, battery or AC outlet. Each modem component requires some electrical power and any reduction in the number of modem components helps to decrease the power drain on the computer's electrical power source.

The data transmission is completed by sending the modulated analog signal from the DAA to the telephone line using, for example, a registered jack-11 (RJ-11) connector. When data is received from the telephone line the flow through these modem components is reversed and the modem demodulates the incoming modulated analog signal into digital data.

Traditionally these modem components have been hardware. But the steadily increasing microprocessing power of computers has made possible the use of software to perform the functions of most modem components. These soft modems, as they are known, provide numerous advantages over the conventional hardware modems. One advantage of a soft modem is that the majority of hardware associated with a modem are eliminated making the soft modem less complicated, more economical and more reliable. Another advantage of a soft modem is that feature updates and bug fixes can be provided by simply downloading patches from a bulletin board service (BBS) or the worldwide web (WWW), thus eliminating the inconvenience of having to update the flash memory on the printed circuit board of the modem. Soft modems also decrease the drain on the computer's electrical power source because some hardware components are eliminated. In a true soft modem the DSP components of the modem are all software and the controller functions are performed by the computer's central processing unit (CPU). Because the DAA is an impedance matching device and contains protection circuitry, however, the DAA must be hardware.

This requirement that the DAA must be hardware also simplifies the regulatory and certification process of the modem. With a soft modem, the manufacturer can concentrate on configuring the DAA to meet the local regulations without involving other modem components. Moreover, the regulatory and certification process is simplified because the DAA by itself has a ringer equivalent number (REN) equal to one. The REN is a measure of how much power a device draws from the telephone line, and the DAA has a REN equal to other devices such as telephones, fax machines and answering machines.

One disadvantage of existing conventional and soft modems is that, as mentioned above, the DAA must be hardware and thus still requires electrical power to operate. When the modem is located on a portable computer such as, for example, a notebook computer or a personal digital assistant (PDA), this power consumption by the DAA can severely drain and shorten battery life. In a personal computer (PC) or any host computer (HC) this power consumption by the DAA can lead to higher operating temperatures and can impose additional cooling requirements that increase the cost, the complexity and the size of the computer.

Another disadvantage of existing modems is that they must be "tethered" to telephone line by a telephone cable. This tethering severely restricts the portability of all types of computers, especially the conventional PC and the portable computers. For example, is it quite difficult to relocate the computer any more than a short distance from the telephone jack because of this tethering requirement. For these reasons there exists a need for a modem that retains all the advantages of a soft modem while reducing the power burden and eliminating the tethering restrictions on the computer.

SUMMARY OF THE INVENTION

To overcome the limitations in the prior art as described above and other limitations that will become apparent upon reading and understanding the present specification, the present invention includes a system and method for wireless data transfer between a computer and a telephone line using a remote media interface (RMI). The system and method of the present invention require less power from the computer and are not connected by cables to the computer. As a result battery life of a portable computer is greatly increased (because less power is drawn from the computer) and the portability of a desktop computer is enhanced (because there is no cabling between the computer and the telephone line). Current modems draw a great deal of power from the computer which significantly shortens a portable computer's battery life. In addition, current modems require cabling between the computer and the telephone line which severely restricts the computer's portability.

The system of the present invention includes a remote media interface (RMI) for transferring data between a computer and a telephone line. The RMI and the computer are physically separate and in bi-directional wireless communication using infrared (IR) transceivers. In a preferred embodiment, the majority of modem components are located in the computer (either as hardware or software) and the only modem component included in the RMI is a data access arrangement (DAA) and possibly a codec. The DAA converts data from the computer (such data in digital form) into a signal that can be transmitted over the telephone lines. The DAA requires electrical power to operate and locating the DAA off the computer eliminates this power burden from the computer. The RMI can be located near an electrical outlet and a telephone jack while the computer can be located virtually anywhere within the range of the IR transceiver. The telephone cable between the computer and the telephone jack is completely eliminated and vastly enhances the portability of the computer.

The present invention also includes a method of wireless transfer of data between a computer and a telephone line using the RMI and the wireless data transfer system. Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWING

Referring now to the drawing in which like reference numbers represent corresponding parts throughout.

DETAILED DESCRIPTION OF THE PREFERRED EMBODIMENT

Figure 1:
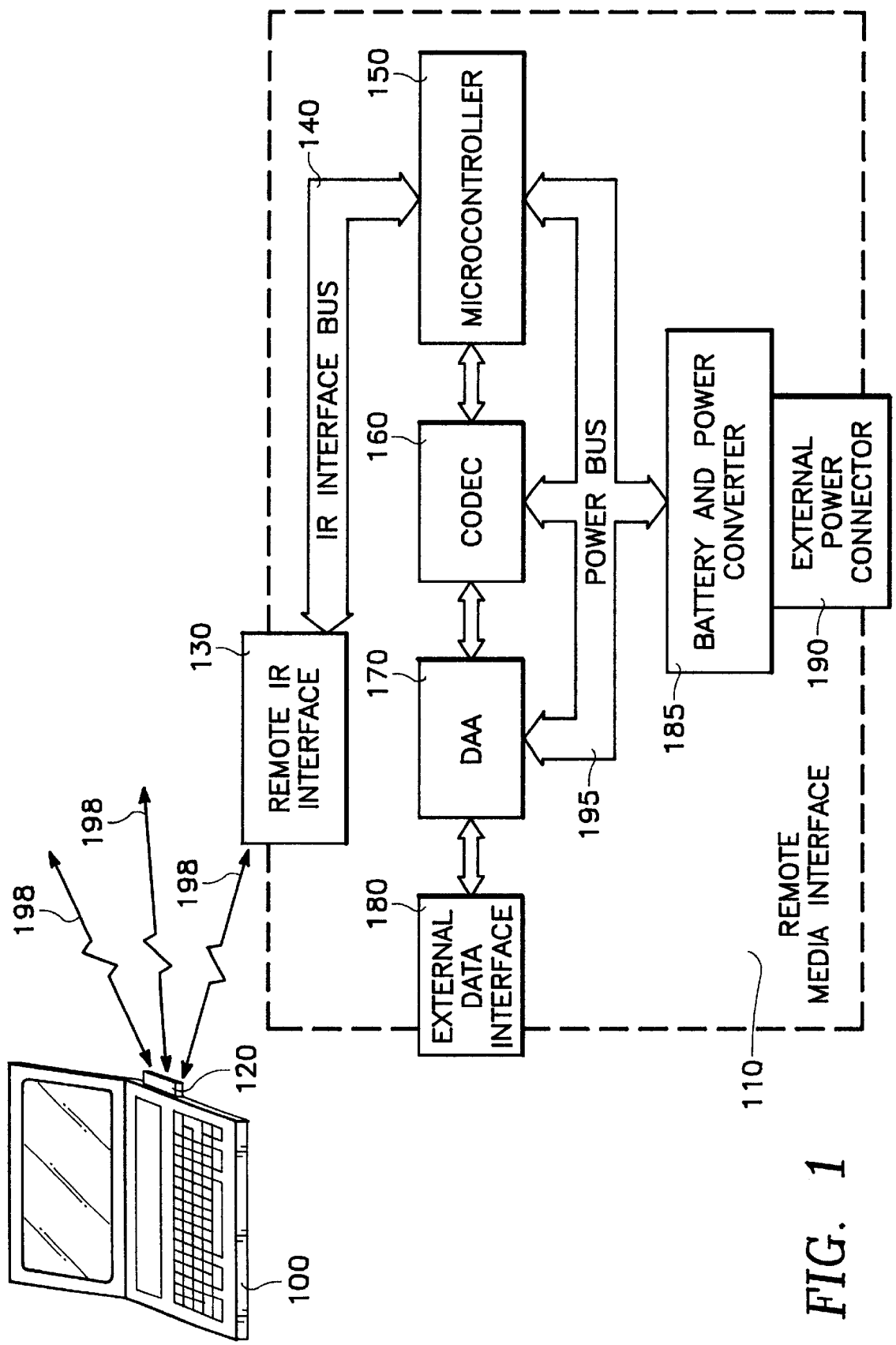
FIG. 1 is a block diagram illustrating the wireless data transfer system and remote media interface (RMI) of the present invention.

In the following detailed description of the preferred embodiment, reference is made to the accompanying drawings in which is shown by way of illustration a specific embodiment whereby the invention may be practiced. It is to be understood that other embodiments may be utilized and structural and functional changes may be made without departing from the scope of the present invention.

I. Structural Aspects

FIG. 1 is a block diagram illustrating the wireless data transfer system and remote media interface (RMI) of the present invention. Although FIG. 1 and the following description are directed at an analog data modem, other data communications mediums can be used for carrying out the present invention. These mediums include but are not limited to AMPS, code-division multiple access (CDMA), global system for mobile communications (GSM), cellular digital packet data (CDPD), time-division multiple access (TDMA) and personal communications service (PCS) type phones. An analog data modem is used as the example in this specification because these modems are widely used and understood and they are probably the most difficult medium for carrying out the present invention.

As shown in FIG. 1 the wireless data transfer system of the present invention includes a hardware platform in the form of a computer 100. This computer 100 may be representative of any type of hardware platform that supports a soft modem including, for example, a laptop or notebook computer, a PDA, a conventional and desktop personal computer (PC) and any host computer (HC). The soft modem performs most modem functions using software instead of hardware. Further, the soft modem provides an interface and facilitates communication between application software such as, for example, an e-mail client or a web browser and the remote media interface (RMI) 110. The soft modem may be implemented on a plurality of operating systems residing on the computer 100 such as, for example, Windows '98®, Windows NT® and Windows CE®, all manufactured by Microsoft® Corporation of Redmond, Wash.

The computer 100 includes an IR interface 120 for bidirectionally transferring data with the RMI 110. One key difference between conventional modems and a preferred embodiment of the present invention is that instead of using a serial port on the computer 100 to communicate with the modem the present invention uses an IR interface 120 to communicate with the RMI 110. Any application software that typically uses a serial port as its external interface is redirected by the soft modem to the IR interface 120.

FIG. 1 also illustrates the RMI 110 which is a device that is physically separate from the computer 100. The RMI 110 includes a remote IR interface 130 for wireless transfer of the data with the IR interface 120 located on the computer 100. The remote IR interface 130 is connected to an IR interface bus 140. A microcontroller 150 includes a microprocessor and storage media including, by way of example, RAM, ROM, EPROM, flash memory. The microcontroller 150 provides processing capability for a codec 160 and a DAA 170. The codec 160 is optional and may be included on the computer 100 instead of the RMI 110 or eliminated altogether. The DAA 170 is connected to an external data interface 180 that interfaces the RMI 110 with the telephone line. Typically the external data interface 180 is a RJ-11 jack with a telephone cable between the external data interface 180 and the telephone line.

The RMI 110 is self-powered and does not use any electrical power from the computer 100. Electrical power is supplied to the RMI 110 by a battery and power converter 185. In addition, an external power connector 190 is coupled to the battery and power converter 185 to permit the use of alternating current (AC) power. In this way, the RMI 110 may be powered by either AC current or battery power. The power is provided to the DAA 170, the codec 160 and the microcontroller 150 through a power bus 195.

II. Functional Aspects

The operation of the wireless data transfer system whereby the computer 100 transmits and receives data with the telephone line through the RMI 110 will now be discussed. This discussion will focus on the computer transmitting data to the telephone line; the complimentary operation of the computer receiving data from the telephone line is the reverse operation.

The computer 100 has a operating system running a soft modem. The soft modem includes a soft signal processor and may include a controller or may use the computer's CPU to perform processing functions. The soft signal processor is a module of the soft modem that performs the same functions of a DSP, thereby eliminating the need for a DSP. The soft modem appears to the applications software as a seamless communications interface. All of the typical data communications features supported by the applications software can be implemented on the computer 100 such as configuration control, call setup and termination, data modulation, error control, data compression and fax processing. Preferably, the soft modem performs all digital domain processing required by the application software and then sends the data to the RMI 110 via the IR interface 120. The IR interface 120 transmits diffuse IR signals 198 containing the data to the RMI 110.

The remote IR interface 130 contained on the RMI 110 receives the transmitted IR signals 198 and sends the IR signals through the IR interface bus 140 to the microcontroller 150. Within the storage media of the microcontroller 150 are contained interface drivers and application specific program code. In addition, the microcontroller 150 provides buffers for buffering the data sent and received between the remote IR interface 130 and the codec 160 and performs data format conversion between the remote IR interface 130 and the codec 160. Further, the microcontroller 150 performs speed conversion of data rates required between the remote IR interface 130 that runs at a fixed speed (typically 115 Kbps) and the codec 160 that requires variable data rates depending on the modulation rate being used. The microcontroller 150 also issues commands to and receives responses from the codec 150 to permit the codec 150 to be configured for specific modes of operation.

The data moves from the microcontroller 150 to the codec 160 where the data is compressed or decompressed. The codec 160 is optional on the RMI 110 and alternate embodiments have the codec 160 located within the computer 100 or eliminated altogether. The data then travels to the DAA 170 where the impedance of the data is matched to the telephone line preparatory to transmission. The external data interface 180 receives the impedance-matched data and transmits the data over the telephone line for reception by the target address.

Power for the DAA 170, the codes 160 and the microcontroller 150 is provided by the battery and power converter 185. The battery and power converter 185 contain a battery within the RMI 110 and a converter for performing power conversion from AC to direct current (DC). This gives the RMI 110 the option of being plugged into an AC power outlet through an external power supply connected to the external power connector 190. Preferably, the RMI 110 is located near a telephone jack and near an AC power outlet so that battery life is not a concern. Power is distributed to the DAA 170, the codec 160 and the microcontroller 150 through the power bus 195.

From the foregoing it will be appreciated that the wireless data transfer system and method using the RMI according to the present invention offer numerous advantages. In particular, the present invention removes the power burden from the computer by relocating the DAA on the RMI instead of on the computer. Because the RMI is self-powered there is no power burden on the computer. Instead of the DAA, which consumes a great deal of power, the computer needs an IR transceiver that uses considerably less power than the DAA. This exchange significantly reduces the power burden on the computer and the benefits include reduced cooling requirements and extended battery life. In addition, the tethering requirements are eliminated thus enhancing the portability of the computer.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A remote media interface for wireless transfer of data between a computer and a telephone line, comprising:

an infrared ("IR") transceiver to bi-directionally communicate analog IR signals with the computer, wherein the computer has a soft-digital signal processor ("soft-DSP") for converting analog IR signals to digital signals and for converting digital signals to analog IR signals;

a data access arrangement to convert an analog IR signal to a signal suitable for transmission over a telephone network and to convert a signal suitable for transmission over a telephone network to an analog IR signal; and an external data interface to transmit and receive the signal over the telephone line.

2. The invention as set forth in claim 1, wherein the remote media interface further comprises a codec for compressing and decompressing the data.

3. The invention as set forth in claim 2, wherein the external data interface is a RJ-11 jack.

4. The invention as set forth in claim 1, wherein the data is in a form capable of transmission and reception by the infrared transceiver.

5. The invention as set forth in claim 4, wherein the data is analog data.

6. The invention as set forth in claim 5, wherein the analog data is a modulated analog signal.

7. The invention as set forth in claim 1, wherein the remote media interface further comprises a microcontroller having a storage media for processing and buffering data.

8. A wireless data transfer system between a computer and a telephone line, comprising:

a first infrared ("IR") transceiver disposed on the computer;

a soft-digital signal processor ("soft-DSP") disposed on the computer to convert analog IR signals to digital signals and to convert digital signals to analog IR signals;

a remote media interface, comprising:

a second IR transceiver to bi-directionally communicate of analog IR signals with the first IR transceiver;

a data access arrangement to convert an analog IR signal to a signal suitable for transmission over a telephone network and to convert a signal suitable for transmission over a telephone network to an analog IR signal; and an external data interface to transmit and receive the signal over the telephone line.

9. The invention as set forth in claim 8, wherein a soft modem is installed on the computer.

10. The invention as set forth in claim 9, wherein the soft modem comprises:

a soft signal processor for performing at least one of: (a) conversion of the data into a modulated analog signal; and (b) conversion of the modulated analog signal into a digital form containing the data.

11. The invention as set forth in claim 8, wherein a codec for compressing and decompressing the data is installed on the computer.

12. The invention as set forth in claim 8, wherein the remote media interface further comprises a codec for compressing and decompressing the data.

13. The invention as set forth in claim 12, wherein the external data interface is a RJ-11 jack.

14. The invention as set forth in claim 8, wherein the remote media interface further comprises a microcontroller having a storage media for processing and buffering data.

15. The invention as set forth in claim 8, wherein the data access arrangement is an impedance matching device.

16. The invention as set forth in claim 15, wherein the data communicated between the first infrared transceiver and the second infrared transceiver is a modulated analog signal.

17. A method of wireless transfer of data between a computer and a telephone line, comprising:
  (a) using an infrared ("IR") signal to bidirectionally transfer analog IR signals between the computer and a remote media interface, the computer having a soft-digital signal processor ("soft-DSP") for converting analog IR signals to digital signals and for converting digital signals to analog IR signals, and the remote media interface having a data access arrangement for converting the data to and from a signal capable of transmission and reception over the telephone line; and
  (b) providing an external data interface on the remote media interface to transmit and receive the signal over the telephone line.

18. The invention as set forth in claim 17, wherein the bidirectional data transfer occurs between a first infrared transceiver disposed on the computer and a second infrared transceiver disposed on the remote media interface.

19. The invention as set forth in claim 18, wherein a soft modem is installed on the computer.

20. The invention as set forth in claim 19, wherein the soft modem comprises:
  a soft signal processor for performing at least one of: (a) conversion of the data into a modulated analog signal; and (b) conversion of the modulated analog signal into a digital form containing the data.

21. The invention as set forth in claim 17, wherein a codec for compressing and decompressing the data is installed on the computer.

22. The invention as set forth in claim 17, wherein the remote media interface further includes a codec for compressing and decompressing the data.

23. The invention as set forth in claim 22, wherein the external data interface is a RJ-11 jack.

24. The invention as set forth in claim 17, wherein the remote media interface further includes a microcontroller having a storage media for processing and buffering data.

25. The invention as set forth in claim 17, wherein the data access arrangement is an impedance matching device.

26. The invention as set forth in claim 25, wherein the data bidirectionally transferred between the computer and the remote media interface is a modulated analog signal.

* * * * *